Patented Sept. 8, 1931

1,822,103

UNITED STATES PATENT OFFICE

AXEL RUDOLF LINDBLAD, OF DJURSHOLM, SWEDEN

METHOD FOR TREATING ARSENIOUS ORE

No Drawing. Application filed April 22, 1930, Serial No. 446,417, and in Sweden April 24, 1929.

In the treatment of arsenious ore such great quantities of arsenious acid ($As_2O_3$) are often obtained that there is no possibility to sell it or find any other suitable use for it. The problem is then how in the cheapest way to transfer the arsenious acid into as undangerous form as possible for throwing it away without risk. The arsenious acid, the so called "poisonous powder" obtained in the roasting of the ore is very finely divided and will therefore easily spread in the air as dust. The arsenious acid thus obtained in form of powder must therefore first be transferred into pieces or lumps. Further it is desirable to get the arsenious acid in as insoluble form as possible.

According to the present invention this is obtained in such a way that the arsenious acid or part thereof obtained in the roasting of the ore is stirred with cement and water, whereafter the mixture is allowed to solidify or harden. The mass may be formed into briquettes or blocks, or it may have the form of lumps which are not given any special shape. The necessary quantity cement varies somewhat with the fineness of the flour of arsenious acid; as a rule 10 to 20% is suitable. The said material may be mixed in any suitable way for instance in usual apparatus intended for the mixing of cement. The process should as far as possible be carried out in a mechanical way so that manual work, which always is unpleasant or dangerous in the case of such a poisonous material, as far as possible may be obviated. The cement containing mass thus obtained that might be specially formed or not hardens rapidly and may thereafter be easily handled and it is difficultly soluble in water. If the work or plant be situated at a coast the simplest way is to transport the arsenic mass to a place where the water has a sufficient depth and simply throw it in the sea. No trouble whatever in a hygienic respect will thereby be caused. The blocks or lumps of the "arsenic-cement" will dissolve so slowly that there will be no risk that the fishes die.

Where there is no possibility of throwing the arsenic-cement in the water, it can be thrown into old mine pits, crevices or other places that may be suitable for the purpose.

Having thus described my invention I declare that what I claim is:—

1. The improvement in the art of roasting those ores which yield a plethora of arsenious acid in the form of a soluble powder tending to float in the air, comprising removing the said excess of arsenious acid from the zone of operations in a form harmless to living matter by mixing same with substances which bind the air-floating, soluble powder into a substantially non-friable, non-soluble, aggregate, whereby the arsenious acid may be permanently prevented from acting on any living matter.

2. The improvement in the art of roasting those ores which yield a plethora of arsenious acid in the form of a soluble powder tending to float in the air, comprising removing the said excess of arsenious acid from the zone of the roasting operation in a form harmless to living matter by mixing same with water and cement, forming the mixture into conglomerates, allowing the conglomerates to harden, and placing said conglomerates in locations where the arsenic will be harmless to living matter.

3. In working arsenious ores, the improvement comprising taking the arsenious acid obtained from roasting the ores, stirring same with a mixture of cement and water, and allowing the mass to harden, whereby the arsenious acid is transformed into an innocuous and easily handled form.

In testimony whereof I affix my signature.

AXEL RUDOLF LINDBLAD.